US012614481B2

(12) United States Patent
Li

(10) Patent No.: US 12,614,481 B2
(45) Date of Patent: Apr. 28, 2026

(54) PROJECTION DISPLAY METHOD AND APPARATUS, TERMINAL, AND NON-TRANSITORY STORAGE MEDIUM

(71) Applicant: BEIJING YOUZHUJU NETWORK TECHNOLOGY CO., LTD., Beijing (CN)

(72) Inventor: Chen Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 198 days.

(21) Appl. No.: 18/284,285

(22) PCT Filed: Apr. 7, 2022

(86) PCT No.: PCT/CN2022/085511
§ 371 (c)(1),
(2) Date: Sep. 26, 2023

(87) PCT Pub. No.: WO2022/233213
PCT Pub. Date: Nov. 10, 2022

(65) Prior Publication Data

US 2024/0161664 A1 May 16, 2024

(30) Foreign Application Priority Data

May 6, 2021 (CN) ........................ 202110492250.1

(51) Int. Cl.
*G09G 3/00* (2006.01)

(52) U.S. Cl.
CPC ..... *G09G 3/002* (2013.01); *G09G 2340/0464* (2013.01); *G09G 2354/00* (2013.01)

(58) Field of Classification Search
None
See application file for complete search history.

(56) References Cited

U.S. PATENT DOCUMENTS

2005/0163396 A1 7/2005 Morichika et al.
2009/0298586 A1 12/2009 Ackley et al.
(Continued)

FOREIGN PATENT DOCUMENTS

CN 1799252 A 7/2006
CN 102411854 A 4/2012
(Continued)

OTHER PUBLICATIONS

International Patent Application No. PCT/CN2022/085511; Int'l Search Report; dated Jun. 8, 2022; 3 pages.
(Continued)

*Primary Examiner* — Yi Wang
(74) *Attorney, Agent, or Firm* — BakerHostetler

(57) ABSTRACT

The present disclosure provides a projection display method and apparatus, a terminal, and a non-transitory storage medium. The method includes: detecting a target content within a projection plane; acquiring projection information corresponding to the target content; and projecting the projection information within the projection plane for display based on a display state of the target content. The projection display method provided by the present disclosure is capable of dynamically setting the projection direction according to the display direction of the target content, thus reaching the effect of display content self-adaptation.

9 Claims, 5 Drawing Sheets

(56) References Cited

U.S. PATENT DOCUMENTS

| | | | | |
|---|---|---|---|---|
| 2015/0317784 | A1 | 11/2015 | Oshima | |
| 2017/0038912 | A1 | 2/2017 | Nishida et al. | |
| 2017/0094235 | A1* | 3/2017 | Monaghan | G06T 11/60 |
| 2017/0243052 | A1 | 8/2017 | Sugama et al. | |
| 2019/0121227 | A1* | 4/2019 | Takano | H04N 9/3179 |
| 2019/0392216 | A1* | 12/2019 | McPeters | G06V 20/20 |

FOREIGN PATENT DOCUMENTS

| | | | |
|---|---|---|---|
| CN | 103873800 | A | 6/2014 |
| CN | 107689082 | A | 2/2018 |
| CN | 112231023 | A | 1/2021 |
| CN | 113206987 | A | 8/2021 |
| JP | 2006-031506 | A | 2/2006 |

OTHER PUBLICATIONS

Written Opinion for International Application No. PCT/CN2022/085511, mailed Jun. 8, 2022, 9 Pages.

* cited by examiner

PROJECTION DISPLAY METHOD AND APPARATUS, TERMINAL, AND NON-TRANSITORY STORAGE MEDIUM

CROSS-REFERENCE TO RELATED APPLICATION

The present application is the U.S. National Stage of International Application No. PCT/CN2022/085511, filed on Apr. 7, 2022, which is based on and claims priority to Chinese Patent Application No. 202110492250.1, filed on May 6, 2021, titled "Projection Display Method and Apparatus, Terminal, and Non-Transitory Storage Medium", both of which are hereby incorporated by reference in their entireties.

TECHNICAL FIELD

The present disclosure relates to the field of computer technology, and more particularly, to a projection display method and apparatus, a terminal, and a non-transitory storage medium.

BACKGROUND

Planar interactive projection is to detect the contents of the projection region through the camera, and complete various operations under the projection region through interaction.

SUMMARY

This Summary section is provided to introduce concepts in a brief form, which will be described in detail below in the subsequent Detailed Description section. This Summary section is not intended to identify key features or essential features of the claimed technical solution, nor is it intended to be used to limit the scope of the claimed technical solution.

In order to solve the above problems, the present disclosure provides a projection display method and apparatus, a terminal, and a non-transitory storage medium.

According to an embodiment of the present disclosure, there is provided a projection display method, including:

- detecting a target content within a projection plane;
- acquiring projection information corresponding to the target content; and
- projecting the projection information onto the projection plane for display based on a display state of the target content.

According to an embodiment of the present disclosure, there is provided a projection display apparatus, including:

- a detection module, configured to detect a target content within a projection plane;
- an acquisition module, configured to acquire projection information corresponding to the target content; and
- a projection module, configured to project the projection information onto the projection plane for display based on a display state of the target content.

According to an embodiment of the present disclosure, there is provided a terminal, including: at least one memory and at least one processor; wherein the memory is configured to store program code, and the processor is configured to invoke the program code stored in the memory to perform the method.

According to an embodiment of the present disclosure, there is provided a non-transitory storage medium, the non-transitory storage medium is configured to store program code, the program code is configured to perform the method described above.

By adopting the solution of projection display of the present disclosure, the projection direction can be dynamically set according to the display direction of the target content, and the effect of display content self-adaptation is achieved.

BRIEF DESCRIPTION OF FIGURES

The above and other features, advantages, and aspects of embodiments of the present disclosure will become more apparent by reference to the following Detailed Description when taken in conjunction with the accompanying drawings. Throughout the drawings, the same or similar reference numerals refer to the same or similar elements. It should be understood that the drawings are schematic and components and elements are not necessarily drawn to scale.

DETAILED DESCRIPTION

Figure 1:
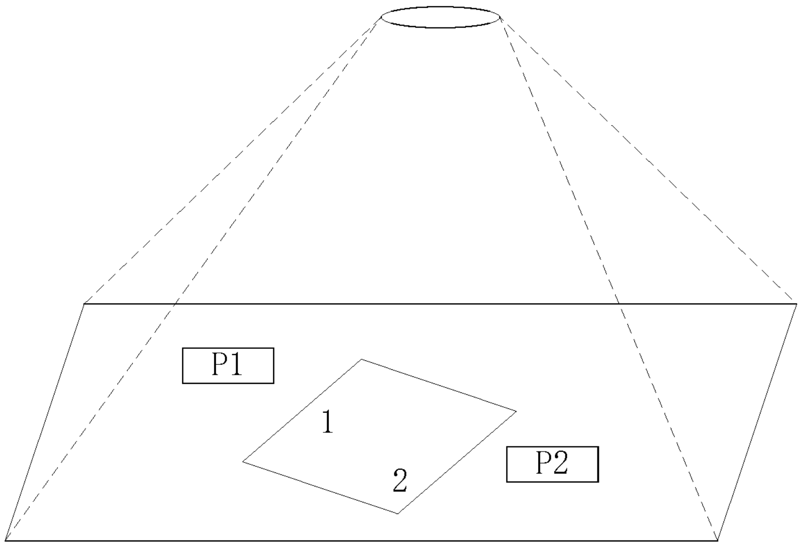
FIG. 1 shows a schematic diagram of an application scenario of an embodiment of the present disclosure.

Embodiments of the present disclosure will be described in more detail below with reference to the accompanying drawings. While certain embodiments of the present disclosure are shown in the accompanying drawings, it should be understood that the present disclosure may be implemented in various forms and should not be construed as being limited to the embodiments set forth herein, but rather, these embodiments are provided for a more thorough and complete understanding of the present disclosure. It should be understood that the figures and embodiments of the present disclosure are for exemplary purposes only and are not intended to limit the protection scope of the present disclosure.

It should be understood that the steps recited in embodiments of the present disclosure may be performed in a different order, and/or in parallel. Furthermore, embodiments may include additional steps and/or omit performance of illustrated steps. The scope of the present disclosure is not limited in this regard.

As used herein, the term "include" and its variants are open including, that is, "including, but not limited to". The term "on the basis of" is "at least partially on the basis of". The term "one embodiment" means "at least one embodiment"; the term "another embodiment" means "at least one other embodiment"; the term "some embodiments" means "at least some embodiments". The term "in response to" and related terms means that one signal or event is affected to some degree by another signal or event, but not necessarily completely or directly. If event x occurs "in response to" event y, then x may be directly or indirectly in response to y. For example, the occurrence of y may eventually lead to the occurrence of x, but there may be other intermediate events and/or conditions. In other cases, y may not necessarily lead to the occurrence of x, and x may occur even if y has not yet occurred. In addition, the term "in response to" may also mean "at least partially in response to".

It should be noted that the concepts such as "first" and "second" mentioned in the present disclosure are only used to distinguish between different devices, modules or units, and are not used to limit the order or interdependence of the functions performed by these devices, modules or units.

It should be noted that modifiers such as "a" and "a plurality" referred to in the present disclosure are schematic rather than limiting, and those skilled in the art will appreciate that unless the context clearly dictates otherwise, it should be understood as "one or more".

A projector is a device that can project an image or video onto a projection surface (such as a wall, a curtain) for a user to view the image projected by the projector from the projection surface. The projection surface may include, but is not limited to, a projection curtain, a wall, or the like having a smooth surface on which the light projected by the projection lens presents a corresponding image. When the target content to be projected is also located on the projection surface, for example, an open book is placed on the desktop, and the user can select a part of the opened page as the projection content; the projection content may include a sentence or a word in a book page, and the corresponding image or interpretation may be invoked according to the selected sentence or word to obtain a dynamic reading effect. However, for example, when a book is shifted in position, please refer to FIG. 1, P1 is the projection information corresponding to part 1 of the book, and P2 is the projection information corresponding to part 2 of the book; after rotation of the book, the content of the book is no longer in the same direction as the projected information, which causes viewing inconvenience to the user. For this case, the present disclosure again proposes an optimized display manner.

Figure 2:
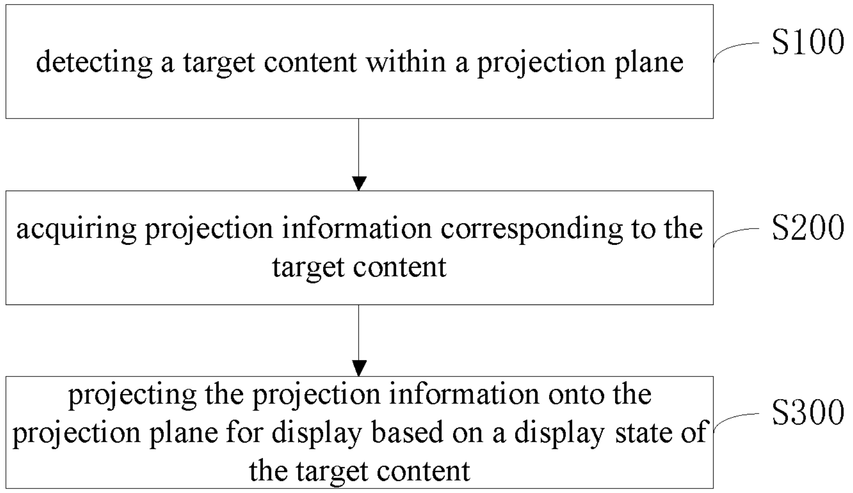
FIG. 2 shows a flowchart of a projection display method of an embodiment of the present disclosure.

As shown in FIG. 2, an embodiment of the present disclosure provides a projection display method, including the following steps.

S100, a target content within a projection plane is detected.

Specifically, the target content of an embodiment of the present disclosure may include various forms of the target content, such as images, words, and the like. The user may select the content in the target content as the projection content, which is projected onto the projection plane in which the target content is located. That is, the target content and the projection content selected from the target content may both lie within the projection plane.

In one embodiment, the target content within the detection projection plane may be identified by an OCR (Optical Character Recognition) algorithm.

S200, projection information corresponding to the target content is acquired.

The projection information includes at least one sub-content in the target content and/or a preset content corresponding to the at least one sub-content. As described above, the projection information of the embodiment of the present disclosure may include a sub-content in the target content such as a certain image in a book, a word in a book or the like, and may further include a preset content corresponding to the sub-content such as detailed information of an author of an image, a background content or the like, or translation parsing of a certain word or the like. In the embodiment of the present disclosure, the user can either select one sub-content to obtain a preset content corresponding thereto, or trigger a plurality of sub-contents to obtain a plurality of results. As shown in FIG. 1, the projection information P1 may correspond to part 1 of the book, and the projection information P2 may correspond to part 2 of the book; wherein P1 and P2 may include the contents of part 1 and part 2, respectively, such as user-specified words, and may also include indications to which the words correspond; or, only the indications may be included. Specifically, the sub-content of an embodiment of the present disclosure may be identified by, for example, the OCR algorithm.

In one embodiment, the step that the projection information corresponding to the target content is acquired may include: the target content is identified by the OCR algorithm and the target content is taken as the projection information, or the projection information associated with the target content is inquired based on a dictionary or a pre-set database after identifying the target content by the OCR algorithm.

S300, the projection information is projected onto the projection plane for display based on a display state of the target content.

Specifically, an embodiment of the present disclosure may include the steps that a first display direction of the target content within the projection plane is acquired; and the projection information is projected in the first display direction onto the projection plane for display. Specifically, the step that the first display direction of the target content within the projection plane is acquired may include: a coordinate system is established on the projection plane; coordinates of the target content within the coordinate system are acquired; and the first display direction is acquired according to the coordinates. The step that the projection information is projected in the first display direction onto the projection plane for display includes: based on a first region location where the target content is located and the first display direction, the projection information is projected in a region other than the first region location on the projection plane in the first display direction for display. More specifically, when the projection information includes information groups consisting of a plurality of sub-contents and/or preset contents corresponding to the plurality of sub-contents, respectively, the step that the projection information is projected in the region other than the first region location on the projection plane in the first display direction for display includes: respective display screen sizes of the plurality of information groups are determined based on a size of a projection plane and a size of the first region location; and the plurality of information groups are displayed in a region other than the first region on the projection plane according to respective display screen sizes and the first display direction. The step that the plurality of information groups are displayed in the region other than the first region on the projection plane according to the respective display screen sizes and the first display direction includes: the plurality of information groups are sorted and the plurality of information groups are sequentially displayed in the region other than the first region on the projection plane according to the respective display screen sizes and the first display direction.

The display state of an embodiment of the present disclosure may include angle information and position information of the target content within the projection plane. The angle information can be obtained by establishing a coordinate system on the projection plane, acquiring reference point coordinates of the target content in the coordinate system, and then acquiring angles of the target content with respect to coordinate axes in the coordinate system according to the reference point coordinates; the position information may include the position of the target content in the projection plane, such as left-leaning or right-leaning information.

Figure 3:
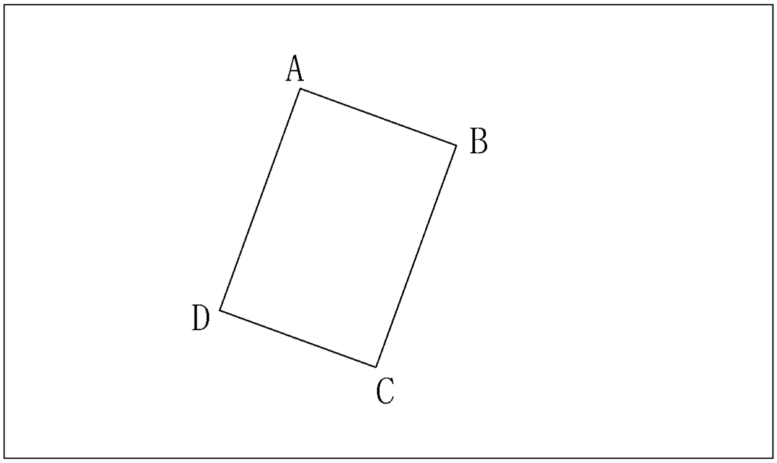
FIG. 3 shows a schematic diagram of a target content within a projection plane of an embodiment of the present disclosure.
Figure 4:
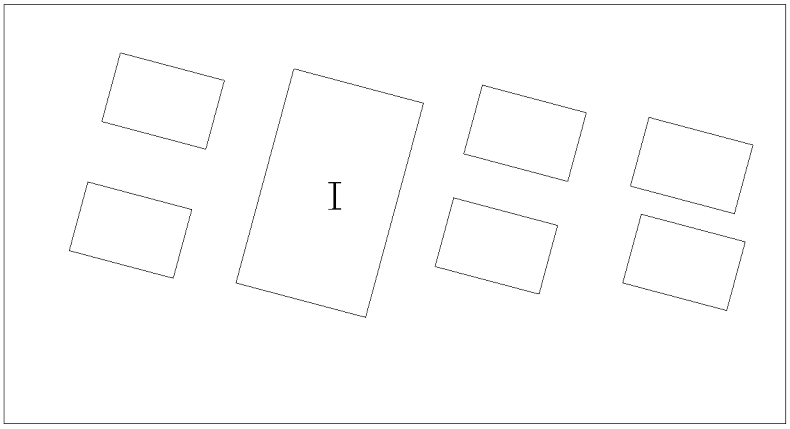
FIG. 4 shows a projection schematic diagram of an embodiment of the present disclosure.
Figure 5:
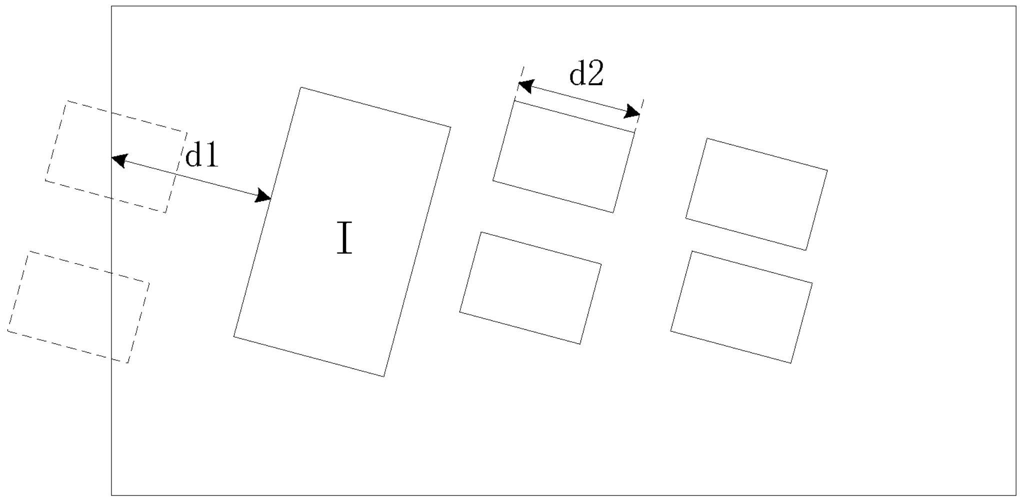
FIG. 5 shows a projection schematic diagram of another embodiment of the present disclosure.

Please refer to FIG. 3, which is a schematic diagram of a target content within a projection plane according to an embodiment of the present disclosure. Specifically, an embodiment of the present disclosure may obtain the angle information of the target content by the reference point coordinates, e.g., coordinates of vertexes ABCD of the target content, according to a connecting line, e.g., AB, etc., of coordinates of two arbitrary adjacent vertexes. Based on the obtained angle information, the projection information is projected onto the projection plane, for example, as shown in FIG. 4, in which the target content I coincides with the display direction of the projection information, and is easy to view. Furthermore, when the position of the target content is too close to the edge of the projection plane, the projection region can be dynamically adjusted; as shown in FIG. 5, when the target content I in FIG. 5 is moved left to the position shown in the figure, the distance on the left side of the target content I is insufficient to display the information group, and therefore, the embodiment of the present disclosure can move the projection information on the left side of the original target content I to the far right of the projection plane for display. In particular, the projection region may include a plurality of mutually non-overlapping sub-regions for projecting a plurality of information groups, respectively. More specifically, in FIG. 4, the distances of the left and right sides of the target content I can both set sub-regions for respectively displaying the projection information; in FIG. 5, since the distance of the target content I from the left side is insufficient to set the sub-region, the left sub-region can be moved to the right side of the target content I when the target content I is moved to the critical position. That is, when the spacing is insufficient to display, for example, a projected text box since the position of, for example, a book is close to the edge of the projection plane, then the projection content may be displayed onto other text boxes/sub-regions. In an embodiment of the present disclosure, the distances in other directions of the target content I, such as distances above and below, may also be evaluated to judge whether to set the sub-region or not, in the manner described above and not repeated here.

An embodiment of the present disclosure may further include: first distances between the target content and projection plane edges are acquired respectively; second distances of the sub-region in directions perpendicular to the corresponding edges are re-acquired, respectively; the first distance is compared to the second distance; when the first distance is not less than the second distance, the sub-region is set at one side of the corresponding edge of the plurality of edges, when d1 is not less than d2 in FIG. 5, the left side of the target content I may be provided with the sub-region for projection; when the first distance is smaller than the second distance, no sub-region is provided on one side of the corresponding edge of the plurality of edges, and when d1 is smaller than d2 in FIG. 5, the left side of the target content I is not used for projection.

In addition, as shown in FIG. 4, when the projection information includes a plurality of information groups, the user can trigger a plurality of sub-contents to project in sequence, and an embodiment of the present disclosure can record the trigger order of the plurality of sub-contents, including: a plurality of sub-regions are sorted; a triggering order of a plurality of sub-contents is acquired; and the plurality of sub-contents and their preset contents are projected to the plurality of sorted sub-regions respectively in the triggering order. The plurality of sub-contents may include, for example, words and pictures in a book, etc., and these sub-contents may obtain extension information such as word annotations, picture shooting information, etc. by triggering operations. When triggering is performed on a plurality of sub contents, an embodiment of the present disclosure may also record the triggering order for subsequent operations.

In particular, the projection region of the projection information overlaps or does not overlap with the region where the target content is located. In an embodiment of the present disclosure, the projection region may not overlap with the region where the target content is located, for example, as shown in FIG. 4; in another embodiment of the present disclosure, the projection region may also overlap or partially overlap with the region where the target content is located, for example, the projection information may be projected in the first display direction to a specific location of the target content, such as a blank of a page of a book, for display. In one embodiment, the specific location of the target content may be identified by the OCR algorithm.

In addition, an embodiment of the present disclosure may further include the step that the display state is detected, a projection direction of the projection information is adjusted from the first display direction to a second direction when the target content changes from the first display direction to the second direction.

Figure 6:
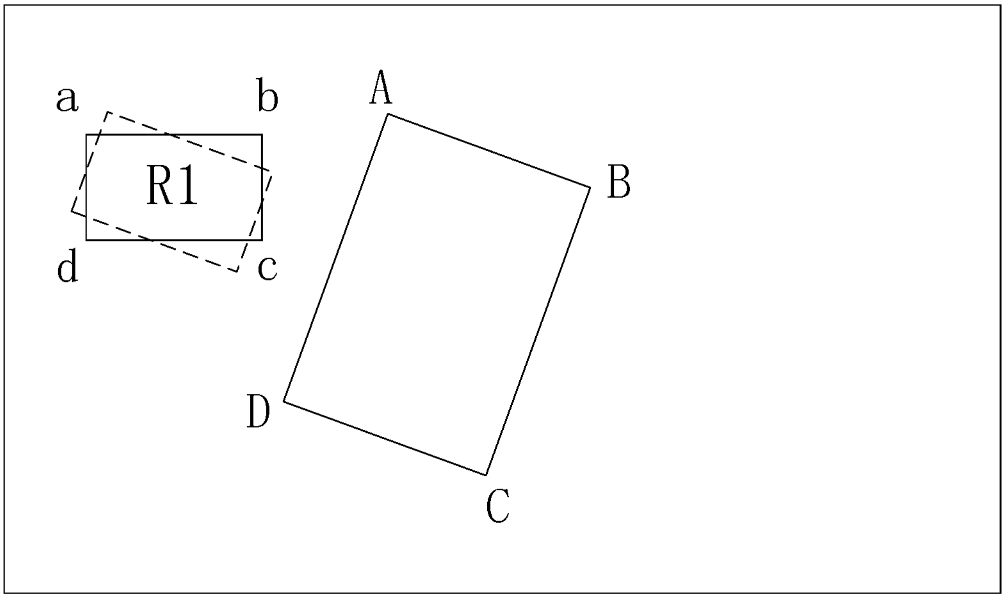
FIG. 6 shows a schematic diagram of an adjustment angle according to an embodiment of the present disclosure.

Please refer specifically to FIG. 6, which is a schematic diagram of an adjustment angle of an embodiment of the present disclosure. The embodiment of the present disclosure may dynamically adjust the projection direction to coincide with the display direction of the target content. Specifically, an embodiment of the present disclosure may include the steps that the projection direction of the display information is acquired; an included angle between the projection direction and the display direction is acquired; and the projection direction is rotated to the display direction according to the included angle. An embodiment of the present disclosure can obtain a rotation angle through the obtained converted position ABCD when it is detected that the target content is turned from the position originally parallel to the projection plane to the position ABCD as shown in FIG. 6, and rotate the position abcd of the projection information RI to coincide with ABCD. The rotation angle can likewise be obtained by means of a coordinate system within the projection plane, which will not be repeated here.

Interactive projection according to embodiments of the present disclosure may be performed by detecting the contents of a book in the projection region by, for example, a camera, and using a finger or a stylus to display operations such as interpretation or point reading of words on the projection region. By detecting the display region such as the outline of a book, the size and direction of the displayed content can be adaptively changed when the projection content is output, so that no matter the user reads from any direction in the projected region, the picture will not be out of harmony with the book content, and the actual experience of the product is improved. Furthermore, the projection region is arranged to be non-coincident with the display region of, for example, a book, so as to avoid coincidence or non-parallelism with the display region of the text caused by movement of the operator in the projection region, and the display content is self-adaptive when the display content is tilted and close to the edge.

Figure 7:
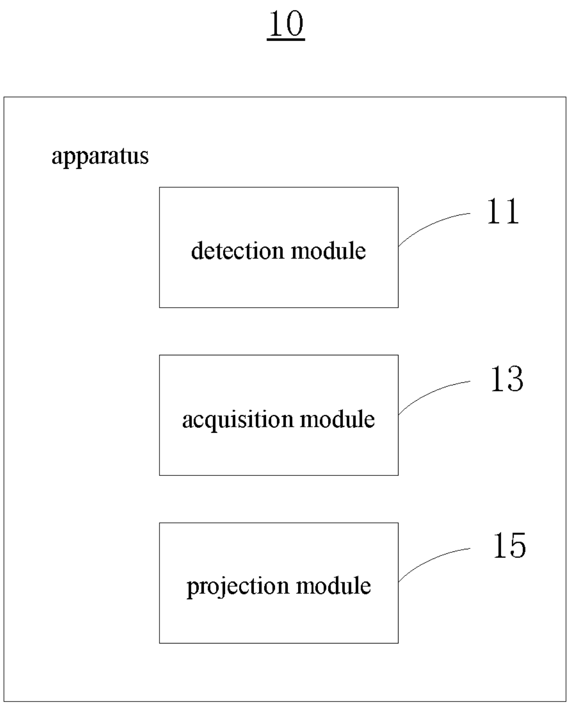
FIG. 7 shows a structural schematic diagram of a projection display apparatus of an embodiment of the present disclosure.

As shown in FIG. 7, FIG. 7 shows a structural schematic diagram of a projection display apparatus of an embodiment of the present disclosure. The apparatus 10 of an embodiment of the present disclosure may include: a detection module11, an acquisition module13, and a projection module15. a detection module, configured to detect a target content within a projection plane; an acquisition module, configured to acquire projection information corresponding to the target content; and a projection module, configured to project the projection information onto the projection plane for display based on a display state of the target content.

In some embodiments, wherein the projection information comprises at least one sub-content in the target content and/or a preset content corresponding to the at least one sub-content.

In some embodiments, the projection module configured to acquiring a first display direction of the target content within the projection plane; and projecting the projection information in the first display direction onto the projection plane for display.

In some embodiments, the projection module configured to establishing a coordinate system on the projection plane; acquiring coordinates of the target content within the coordinate system; and acquiring the first display direction according to the coordinates.

In some embodiments, the projection module configured to detecting the display state, adjusting a projection direction of the projection information from the first display direction to a second direction when the target content changes from the first display direction to the second direction.

In some embodiments, the projection module configured to based on a first region location where the target content is located and the first display direction, projecting the projection information in a region other than the first region location on the projection plane in the first display direction for display.

In some embodiments, the projection information comprises information groups consisting of a plurality of sub-contents and/or preset contents corresponding to the plurality of sub-contents, respectively;

The projection module configured to determining respective display screen sizes of the plurality of information groups based on a size of a projection plane and a size of the first region location; and displaying the plurality of information groups in a region other than the first region on the projection plane according to respective display screen sizes and the first display direction.

In some embodiments, the projection module configured to sorting the plurality of information groups and sequentially displaying the plurality of information groups in the region other than the first region on the projection plane according to the respective display screen sizes and the first display direction.

For the embodiments of the apparatus, which substantially correspond to the method embodiments, reference is made to the partial description of the method embodiments. The apparatus embodiments described above are merely schematic, wherein modules described as separate modules may or may not be separate. Some or all of the modules may be selected according to actual needs to achieve the objective of the embodiment. A person having ordinary skill in the art can understand and implement without inventive step.

In addition, the present disclosure also provides a terminal including: at least one memory and at least one processor; wherein the memory is configured to store program code, and the processor is configured to invoke the program code stored in the memory to perform the method.

In addition, the present disclosure also provides a non-transitory storage medium, the non-transitory storage medium is configured to store program code, the program code is configured to perform the above method.

Figure 8:
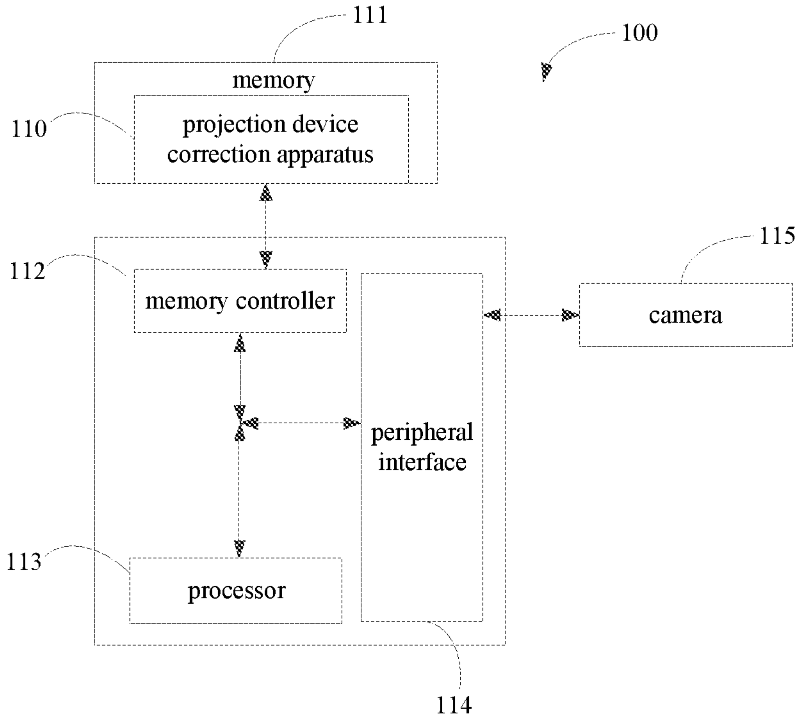
FIG. 8 shows a structural schematic diagram of a terminal of an embodiment of the disclosure.

Referring now to FIG. 8, which shows a structural schematic diagram of a terminal, such as a projector 100, of an embodiment of the disclosure. The projection device 100 in the embodiment of the present disclosure includes a projection device correction apparatus 110, a memory 111, a memory controller 112, a processor 113, a peripheral interface 114, and a camera 115. The memory 111, the memory controller 112, the processor 113, and the peripheral interface 114 are electrically connected, directly or indirectly, to each other to enable the transfer or interaction of data. For example, these components may be electrically connected to each other via one or more communication buses or signal lines. The projection device correction apparatus 110 includes at least one software functional module which may be stored in the memory 111 or cured in the operating system (OS) of the projection device 100 in the form of software or firmware. The processor 113 is configured to execute executable modules stored in the memory, for example, software functional modules or computer programs included by the projection device correction apparatus 110.

The memory 111 may be, but is not limited to, a Random Access Memory (RAM), a Read Only Memory (ROM), a Programmable Read-Only Memory (PROM), an Erasable Programmable Read-Only Memory (EPROM), an Electric Erasable Programmable Read-Only Memory (EEPROM), and the like. The memory 111 is configured to store a program, and the processor 113 executes the program upon receiving an execution instruction.

The processor 113 may be an integrated circuit chip having the signal processing capability. The processor 113 may be a general-purpose processor, including a Central Processing Unit (CPU), a Network Processor (NP), or the like; it may also be a digital signal processor (DSP), an application specific integrated circuit (ASIC), a field programmable gate array (FPGA) or any other programmable logic device, a discrete gate or a transistor logic device, or a discrete hardware component. The general-purpose processor may be a microprocessor or the processor may be any conventional processor or the like.

The peripheral interface 114 couples various input/input devices to the processor 113 and the memory 111. In some embodiments, the peripheral interface 114, the processor 113, and the memory controller 112 may be implemented in a single chip. In other examples, they may each be implemented by a separate chip.

It will be appreciated that the structure shown in FIG. 8 is merely illustrative, and the projection device 100 may also include more or fewer components than shown in FIG. 8, or have a different configuration than shown in FIG. 8. The various components shown in FIG. 8 may be implemented in hardware, software, or a combination thereof.

In some embodiments, a projection display method, comprising:

detecting a target content within a projection plane;

acquiring projection information corresponding to the target content; and projecting the projection information onto the projection plane for display based on a display state of the target content.

In some embodiments, wherein the projection information comprises at least one sub-content in the target content and/or a preset content corresponding to the at least one sub-content.

In some embodiments, wherein projecting the projection information onto the projection plane for display based on the display state of the target content comprises:

acquiring a first display direction of the target content within the projection plane; and projecting the projection information in the first display direction onto the projection plane for display.

In some embodiments, wherein acquiring the first display direction of the target content within the projection plane comprises:

establishing a coordinate system on the projection plane;

acquiring coordinates of the target content within the coordinate system; and acquiring the first display direction according to the coordinates.

In some embodiments, further comprising:

detecting the display state, adjusting a projection direction of the projection information from the first display direction to a second direction when the target content changes from the first display direction to the second direction.

In some embodiments, wherein projecting the projection information in the first display direction onto the projection plane for display comprises:

based on a first region location where the target content is located and the first display direction, projecting the projection information in a region other than the first region location on the projection plane in the first display direction for display.

In some embodiments, wherein the projection information comprises information groups consisting of a plurality of sub-contents and/or preset contents corresponding to the plurality of sub-contents, respectively;

wherein projecting the projection information in the region other than the first region location on the projection plane in the first display direction for display comprises:

determining respective display screen sizes of the plurality of information groups based on a size of a projection plane and a size of the first region location; and displaying the plurality of information groups in a region other than the first region on the projection plane according to respective display screen sizes and the first display direction.

In some embodiments, wherein displaying the plurality of information groups in the region other than the first region on the projection plane according to the respective display screen sizes and the first display direction comprises:

sorting the plurality of information groups and sequentially displaying the plurality of information groups in the region other than the first region on the projection plane according to the respective display screen sizes and the first display direction.

In some embodiments, a projection display apparatus, comprising:

a detection module, configured to detect a target content within a projection plane;

an acquisition module, configured to acquire projection information corresponding to the target content; and a projection module, configured to project the projection information onto the projection plane for display based on a display state of the target content.

The above description is merely the illustration of preferred embodiments of the present application and the technical principles used. It should be understood by those skilled in the art that the scope of the present application referred to herein is not limited to technical solutions formed by specific combinations of the above technical features, but also contains other technical solutions formed by any combination of the above technical features or equivalent features thereof without departing from the above inventive concept, such as, technical solutions formed by interchanging the above features with (but not limited to) the technical features with similar functions disclosed in the present application.

What is claimed is:

1. A projection display method, comprising:

detecting a target content within a projection plane;

detecting angle information of the target content within the projection plane;

acquiring a first display direction of the target content in the projection plane based on the angle information of the target content;

acquiring at least one sub-content of the target content or a preset content corresponding to the at least one sub-content of the target content as projection information to be projected onto the projection plane; and projecting the projection information in the first display direction onto the projection plane for display, wherein the projection information comprises a plurality of information groups, and wherein the projecting the projection information in the first display direction onto the projection plane comprises:

determining respective display sizes of the plurality of information groups based on a size of the projection plane and a size of a first region where the target content is located, and sorting and sequentially displaying the plurality of information groups in a region other than the first region on the projection plane according to the respective display sizes and the first display direction.

2. The method according to claim 1, wherein the acquiring the first display direction of the target content comprises:

establishing a coordinate system on the projection plane;

acquiring coordinates of the target content in the coordinate system;

acquiring angles of the target content with respect to coordinate axes in the coordinate system based on the coordinates; and acquiring the first display direction based on the angles of the target content.

3. The method according to claim 1, further comprising:

adjusting a projection direction of the projection information from the first display direction to a second direction when the target content changes from the first display direction to the second direction.

4. A terminal, comprising:

at least one memory and at least one processor, wherein the at least one memory is configured to store program code, and the at least one processor is configured to invoke the program code stored by the at least one memory to perform operations comprising:

detecting a target content within a projection plane;

detecting angle information of the target content within the projection plane;

acquiring a first display direction of the target content in the projection plane based on the angle information of the target content;

acquiring at least one sub-content of the target content or a preset content corresponding to the at least one sub-content of the target content as projection information to be projected onto the projection plane; and projecting the projection information in the first display direction onto the projection plane for display, wherein the projection information comprises a plurality of information groups, and wherein the projecting the projection information in the first display direction onto the projection plane comprises:

determining respective display sizes of the plurality of information groups based on a size of the projection plane and a size of a first region where the target content is located, and sorting and sequentially displaying the plurality of information groups in a region other than the first region on the projection plane according to the respective display sizes and the first display direction.

5. The terminal according to claim 4, wherein the acquiring the first display direction of the target content comprises:

establishing a coordinate system on the projection plane;

acquiring coordinates of the target content in the coordinate system;

acquiring angles of the target content with respect to coordinate axes in the coordinate system based on the coordinates; and acquiring the first display direction based on the angles of the target content.

6. The terminal according to claim 4, the operations further comprising:

adjusting a projection direction of the projection information from the first display direction to a second direction when the target content changes from the first display direction to the second direction.

7. A non-transitory storage medium for storing program code, the program code upon execution by a processor causes the processor to perform operations comprising:

detecting a target content within a projection plane;

detecting angle information of the target content within the projection plane;

acquiring a first display direction of the target content in the projection plane based on the angle information of the target content;

acquiring at least one sub-content of the target content or a preset content corresponding to the at least one sub-content of the target content as projection information to be projected onto the projection plane; and projecting the projection information in the first display direction onto the projection plane for display, wherein the projection information comprises a plurality of information groups, and wherein the projecting the projection information in the first display direction onto the projection plane comprises:

determining respective display sizes of the plurality of information groups based on a size of the projection plane and a size of a first region where the target content is located, and sorting and sequentially displaying the plurality of information groups in a region other than the first region on the projection plane according to the respective display sizes and the first display direction.

8. The non-transitory storage medium according to claim 7, wherein the acquiring the first display direction of the target content comprises:

establishing a coordinate system on the projection plane;

acquiring coordinates of the target content in the coordinate system;

acquiring angles of the target content with respect to coordinate axes in the coordinate system based on the coordinates; and acquiring the first display direction based on the angles of the target content.

9. The non-transitory storage medium according to claim 7, the operations further comprising:

adjusting a projection direction of the projection information from the first display direction to a second direction when the target content changes from the first display direction to the second direction.

* * * * *